US011622091B2

(12) United States Patent
Trepanier

(10) Patent No.: US 11,622,091 B2
(45) Date of Patent: Apr. 4, 2023

(54) FACILITATING VIDEO MONITORING OF AT LEAST ONE LOCATION

(71) Applicant: GENETEC INC., Montreal (CA)

(72) Inventor: Jean-David Trepanier, St-Hubert (CA)

(73) Assignee: GENETEC INC., Montreal (CA)

( * ) Notice: Subject to any disclaimer, the term of this patent is extended or adjusted under 35 U.S.C. 154(b) by 253 days.

(21) Appl. No.: 16/670,979

(22) Filed: Oct. 31, 2019

(65) Prior Publication Data
US 2021/0136325 A1    May 6, 2021

(51) Int. Cl.
H04N 7/18 (2006.01)
H04N 5/91 (2006.01)
H04N 19/40 (2014.01)
G06T 1/00 (2006.01)

(52) U.S. Cl.
CPC ............... *H04N 7/181* (2013.01); *G06T 1/00* (2013.01); *H04N 5/91* (2013.01); *H04N 19/40* (2014.11)

(58) Field of Classification Search
CPC .......... H04N 7/181; H04N 5/91; H04N 19/40; G06T 1/00
See application file for complete search history.

(56) References Cited

U.S. PATENT DOCUMENTS

| 2013/0066623 A1* | 3/2013 | Chou ................. H04L 67/2823 704/2 |
| 2015/0381536 A1 | 12/2015 | Ptitsyn |
| 2018/0018081 A1* | 1/2018 | Dattilo-Green ........ H04N 7/181 |
| 2018/0115788 A1* | 4/2018 | Burns .................... H04N 7/185 |
| 2019/0124401 A1* | 4/2019 | Lentner ............. H04N 21/2143 |

OTHER PUBLICATIONS

International Search Report and Written Opinion dated Jan. 29, 2021 in connection with PCT application No. PCT/CA2020/051461, 11 pages.

\* cited by examiner

*Primary Examiner* — Girumsew Wendmagegn

(57) ABSTRACT

A method of facilitating video monitoring of at least one location involves: causing a web application hosted by a local application on a local computing device to cause the local computing device to transcode input video data encoded in an input video encoding format to transcoded video data transcoded in a transcoded video encoding format supported for rendering by the local application, the input video data representing at least one video recording by at least one video recording device at the at least one location; and causing the web application to cause the local computing device to render the at least one video recording using the transcoded video data. Other methods, and computer-readable storage media and systems, are also disclosed.

21 Claims, 8 Drawing Sheets

FACILITATING VIDEO MONITORING OF AT LEAST ONE LOCATION

FIELD

This disclosure relates generally to facilitating video monitoring of at least one location.

RELATED ART

Applications on computing devices may facilitate video monitoring one or more locations, for example by receiving and rendering video data representing at least one video recording by at least one video recording device at the one or more locations. However, known such applications may have some disadvantages.

SUMMARY

According to one embodiment, there is disclosed a method of facilitating video monitoring of at least one location, the method comprising: causing a web application hosted by a local application on a local computing device to cause the local computing device to transcode input video data encoded in an input video encoding format to transcoded video data transcoded in a transcoded video encoding format supported for rendering by the local application, the input video data representing at least one video recording by at least one video recording device at the at least one location; and causing the web application to cause the local computing device to render the at least one video recording using the transcoded video data.

In some embodiments, the method further comprises causing the local computing device to determine whether the local computing device is able to transcode the input video data to the transcoded video encoding format. In some embodiments, causing the web application to cause the local computing device to transcode the input video data to the transcoded video encoding format comprises causing the local computing device to transcode the input video data to the transcoded video encoding format in response to a determination that the local computing device is able to transcode the input video data to the transcoded video encoding format.

In some embodiments: causing the local computing device to determine whether the local computing device is able to transcode the input video data to the transcoded video encoding format comprises causing the local computing device to determine whether a media gateway is executable on the local computing device; and causing the web application to cause the local computing device to transcode the input video data to the transcoded video encoding format comprises causing the web application to cause the media gateway to transcode the input video data to the transcoded video encoding format.

In some embodiments, program codes of the local application comprise program codes of the media gateway.

In some embodiments, the media gateway is separate from the local application.

In some embodiments, the method further comprises: causing the local computing device to receive at least one video recording device selection input signal representing user selection of the at least one video recording device from a plurality of video recording devices of a video monitoring system comprising the at least one video recording device; and causing the local computing device to receive the input video data from the at least one video recording device in response to receiving the at least one video recording device selection input signal. In some embodiments, causing the local computing device to determine whether the local computing device is able to transcode the input video data to the transcoded video encoding format comprises causing the local computing device to determine whether the local computing device is able to transcode the input video data to the transcoded video encoding format in response to receiving the at least one video recording device selection input signal.

In some embodiments, causing the web application to cause the local computing device to render the at least one recording comprises causing the web application to cause at least one display associated with the local computing device to display the video recording.

In some embodiments, the at least one display comprises at least one display screen controlled by the local computing device.

In some embodiments, the method further comprises causing the local computing device to receive at least one display selection input signal representing user selection of the at least one display from a plurality of displays associated with the local computing device.

In some embodiments, the input video data represent inter coded frames of the video recording.

In some embodiments, the method further comprises causing the local computing device to receive the input video data from the at least one video recording device.

In some embodiments, causing the local computing device to receive the input video data from the at least one video recording device comprises causing the local computing device to receive the input video data from the at least one video recording device using at least one computer network.

In some embodiments, causing the local computing device to receive the input video data from the at least one video recording device using the at least one computer network comprises streaming the at least one video recording.

In some embodiments, the method further comprises: causing the local computing device to receive at least one video recording device selection input signal representing user selection of the at least one video recording device from a plurality of video recording devices of a video monitoring system comprising the at least one video recording device; and causing the local computing device to receive the input video data from the at least one video recording device in response to receiving the at least one video recording device selection input signal.

In some embodiments, the web application is a progressive web application.

In some embodiments, causing the web application to cause the local computing device to render the at least one video recording using the transcoded video data comprises causing functionality of a web browser to render the at least one video.

In some embodiments: program codes of the local application comprise web browser functionality program codes; and causing the functionality of the web browser to render the at least one video comprises causing the local computing device to execute the web browser functionality program codes.

In some embodiments, the web browser functionality program codes comprise program codes of a web browser.

In some embodiments, the transcoded video encoding format is a video encoding format supported for rendering by the functionality of the web browser.

In some embodiments, the at least one video recording device produces the input video data in the input video encoding format.

In some embodiments, the method further comprises causing the local computing device to determine whether the input video encoding format is supported for rendering by the local application. In some embodiments, causing the web application to cause the local computing device to transcode the input video data to the transcoded video encoding format comprises causing the web application to cause the local computing device to transcode the input video data to the transcoded video encoding format in response a determination that the input video encoding format is not supported for rendering by the local application.

In some embodiments, the method further comprises: causing the local computing device to receive at least one video recording device control input signal; and causing the local computing device to control the at least one video recording device in response to receiving the at least one video recording device control input signal.

In some embodiments, causing the local computing device to control the at least one video recording device comprises causing the local computing device to cause the at least one video recording device to change a field of view of the at least one video recording device.

According to another embodiment, there is disclosed at least one non-transitory computer-readable storage medium comprising program codes stored thereon that, when executed by at least one processor, cause a web application hosted by a local application on a local computing device to cause the local computing device to, at least: transcode input video data encoded in an input video encoding format to transcoded video data transcoded in a transcoded video encoding format supported for rendering by the local application; and render the at least one video recording using the transcoded video data.

According to another embodiment, there is disclosed a video monitoring system comprising a local computing device comprising: at least one non-transitory computer-readable storage medium comprising program codes stored thereon; and at least one processor operable to execute the program codes and control the at least one media interface. The program codes, when executed by the at least one processor, cause a web application hosted by a local application on the local computing device to cause the local computing device to, at least: transcode input video data encoded in an input video encoding format to transcoded video data transcoded in a transcoded video encoding format supported for rendering by the local application; and render the at least one video recording using the transcoded video data.

In some embodiments, the system further comprises a video recording device at a location. In some embodiments, the video recording device is operable to, at least: produce the input video data representing at least one video recording by the video recording device at the location; and transmit the input video data to the local computing device.

According to another embodiment, there is disclosed a method of facilitating video monitoring of at least one location, the method comprising: causing a web application, hosted by a local application on a local computing device, to cause a media gateway on the local computing device to receive input video data encoded in an input video encoding format, the input video data representing at least one video recording by at least one video recording device at the at least one location; causing the media gateway to transcode the input video data from the input video encoding format to transcoded video data transcoded in a transcoded video encoding format supported for rendering by the local application; and causing the media gateway to communicate the transcoded video data to the web application.

In some embodiments, program codes of the local application comprise program codes of the media gateway.

In some embodiments, the media gateway is separate from the local application.

In some embodiments, causing the web application to cause the media gateway to receive the input video data comprises causing the transcoded video data to be requested from the media gateway.

In some embodiments, causing the web application to cause the media gateway to receive the input video data comprises: causing the local application to receive, from the web application, a request the input video data from a remote computing device remote from the local computing device; and causing the local application to request the input video data from the remote computing device.

In some embodiments, the input video data represent inter coded frames of the video recording.

In some embodiments, causing the media gateway to receive the input video data comprises causing the local computing device to receive the input video data using at least one computer network.

In some embodiments, causing the local computing device to receive the input video data using the at least one computer network comprises streaming the at least one video recording.

In some embodiments, the web application is a progressive web application.

In some embodiments, the at least one video recording device produces the input video data in the input video encoding format.

According to another embodiment, there is disclosed at least one non-transitory computer-readable storage medium comprising program codes stored thereon that, when executed by at least one processor, cause a local application on a local computing device to cause the local computing device to, at least: in response to a request from a web application hosted by the local application, cause a media gateway on the local computing device to receive input video data encoded in an input video encoding format; cause the media gateway to transcode the input video data from the input video encoding format to transcoded video data transcoded in a transcoded video encoding format supported for rendering by the local application; and cause the media gateway to communicate the transcoded video data to the web application.

According to another embodiment, there is disclosed a video monitoring system comprising a local computing device comprising: at least one non-transitory computer-readable storage medium comprising program codes stored thereon; and at least one processor operable to execute the program codes and control the at least one media interface. The program codes, when executed by the at least one processor, cause a web application hosted by a local application on the local computing device to cause the local computing device to, at least: in response to a request from a web application hosted by the local application, cause a media gateway on the local computing device to receive input video data encoded in an input video encoding format; cause the media gateway to transcode the input video data from the input video encoding format to transcoded video data transcoded in a transcoded video encoding format supported for rendering by the local application; and cause the media gateway to communicate the transcoded video data to the web application.

In some embodiments, the system further comprises a video recording device at a location, wherein the video recording device is operable to, at least: produce the input video data representing at least one video recording by the video recording device at the location; and transmit the input video data to the local computing device.

Other aspects and features will become apparent to those ordinarily skilled in the art upon review of the following description of illustrative embodiments in conjunction with the accompanying figures.

DETAILED DESCRIPTION

Figure 1:
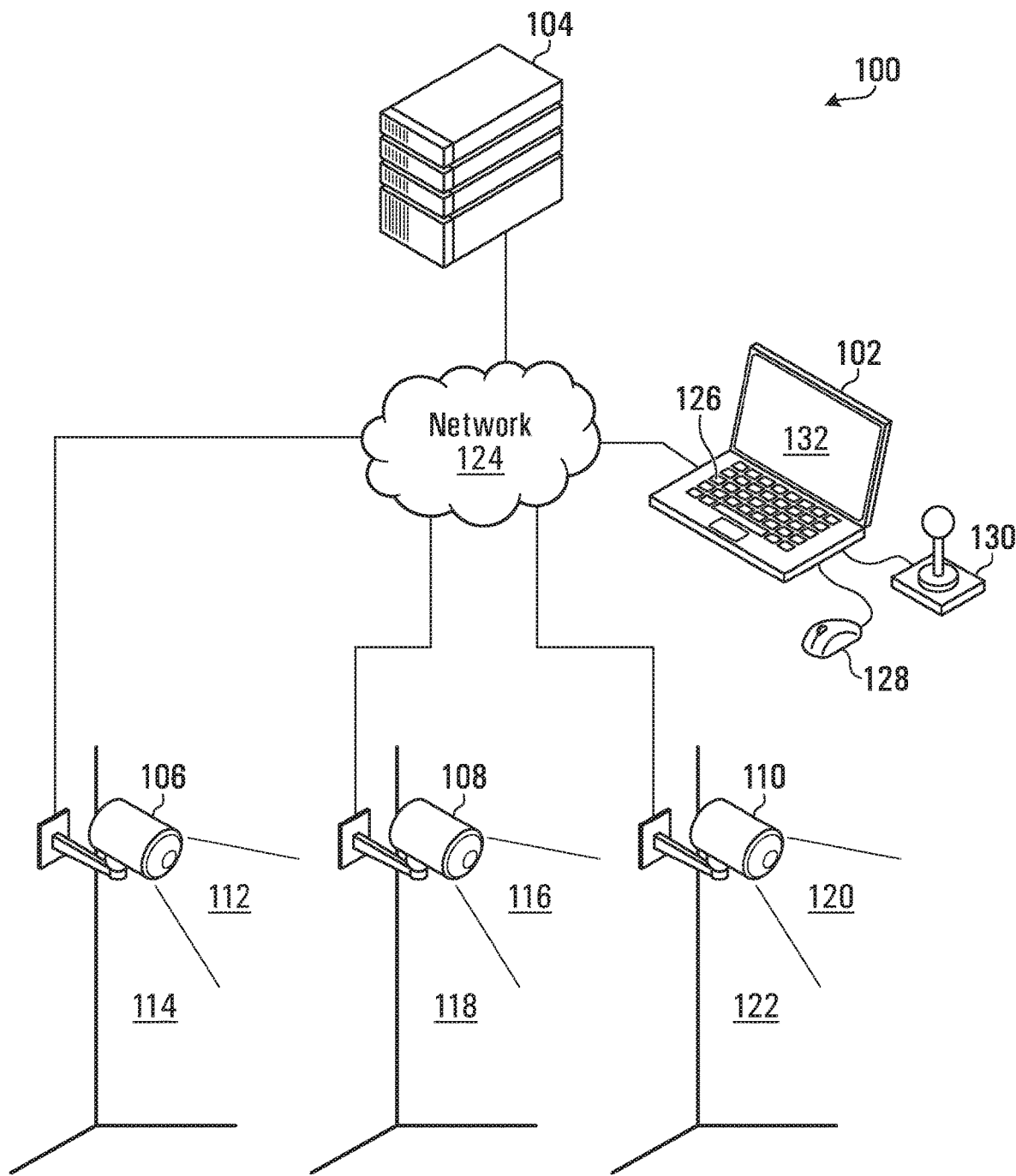
FIG. 1 is a schematic illustration of a video monitoring system according to one embodiment.

Referring to FIG. 1, a video monitoring system according to one embodiment is shown generally at 100 and includes a local computing device 102, a server (or remote computing device) 104, and video recording devices 106, 108, and 110.

The video recording device 106 has a field of view 112 at a location 114. The video recording device 108 has a field of view 116 at a location 118. The video recording device 110 has a field of view 120 at a location 122. In general, the video recording devices 106, 108, and 110 may record video in their respective fields of view 112, 116, and 120 to monitor their respective locations 114, 118, and 122 and produce video data. Such video data may represent one or more video recordings by the video recording devices 106, 108, and 110 at their respective locations 114, 118, and 122, and may represent inter coded frames of such one or more video recordings. The fields of view 112, 116, and 120 may change, for example by changing pan, tilt, or zoom, or a combination of two or more thereof, although alternative embodiments may differ. The embodiment shown includes three video recording devices at respective different locations, but alternative embodiments may differ. For example, alternative embodiments may include more or fewer video recording devices, and alternative embodiments may include one or more than one video recording device at one or more locations.

The local computing device 102, the server 104, and the video recording devices 106, 108, and 110 may be in communication with each other using a computer network 124, which may include the Internet, a wide area network (WAN), a local area network (LAN), one or more other types of computer network, or a combination of two or more thereof. The local computing device 102, the server 104, and the video recording devices 106, 108, and 110 may be in communication with the computer network 124 using one or more wired connections, one or more wireless connections, or a combination thereof, for example.

The embodiment shown includes only one local computing device 102, but alternative embodiments may include one or more local computing devices such as the local computing device 102. Further, the embodiment shown includes only one server 104, but alternative embodiments may include one or more servers (or remote computing devices), and such one or more servers may function individually or collectively similarly to the server 104. In general, such one or more local computing devices may all be in communication with such one or more servers and one or more video recording devices (such as the video recording devices 106, 108, and 110). Therefore, "server" herein may refer to one or more computing devices that may provide server functionality of a video monitoring system to multiple local computing devices as described herein, for example.

Figure 2:
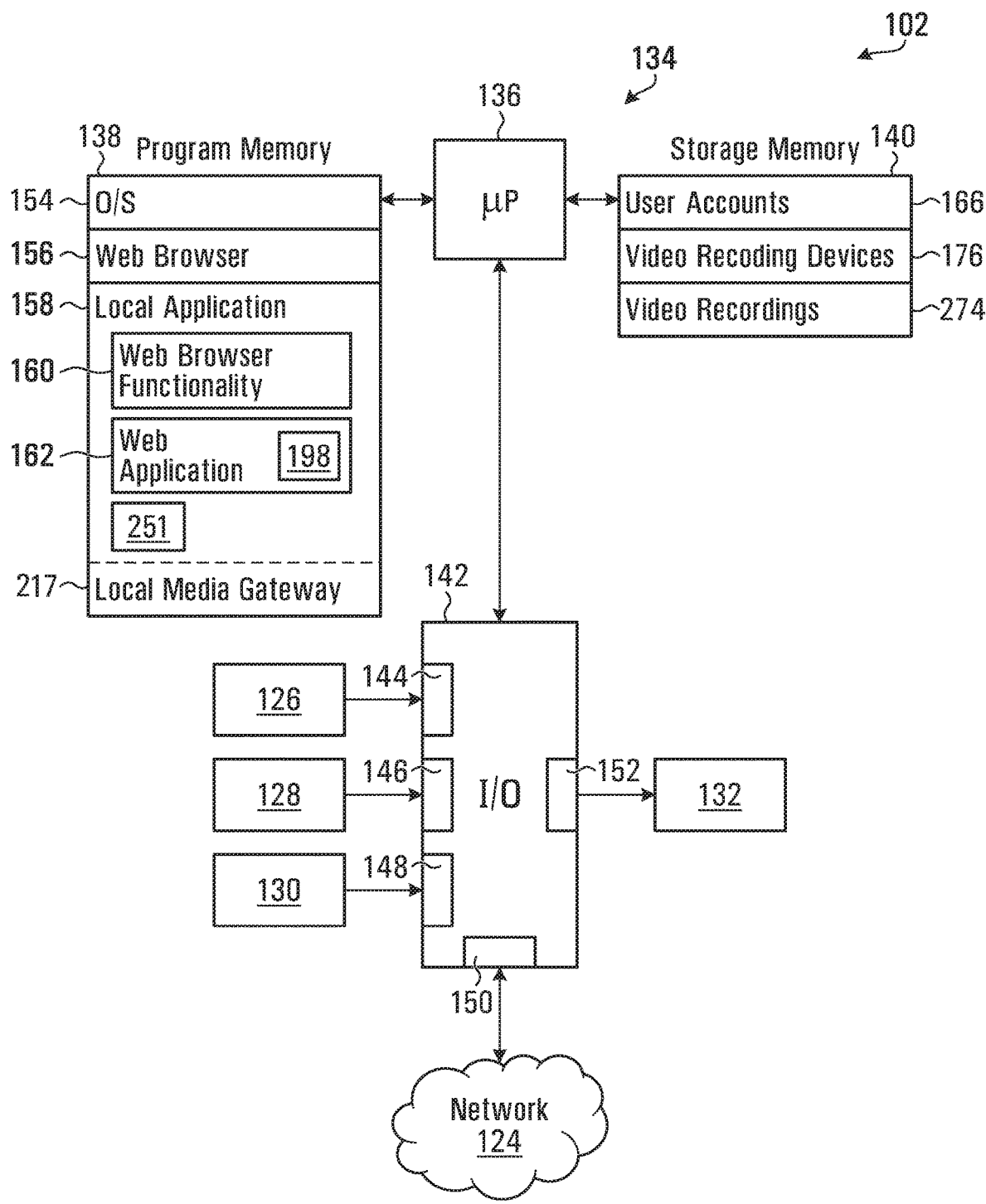
FIG. 2 is a schematic illustration of a local computing device of the video monitoring system of FIG. 1.

The local computing device 102 in the embodiment shown is a laptop computer including a keyboard 126, a mouse 128, a pan-tilt-zoom (PTZ) joystick 130, and a display screen 132. Referring to FIG. 2, the local computing device 102 includes a processor circuit shown generally at 134. The processor circuit 134 includes a central processing unit (CPU) or microprocessor 136. The processor circuit 134 also includes a program memory 138, a storage memory 140, and an input/output (I/O) module 142, all in communication with the microprocessor 136.

In general, the program memory 138 stores program codes that, when executed by the microprocessor 136, cause the processor circuit 134 to implement functions of the local computing device 102 such as those described herein, for example. Further, in general, the storage memory 140 includes stores for storing storage codes as described herein, for example. The program memory 138 and the storage memory 140 may be implemented in one or more of the same or different storage media, which in various embodiments may include one or more of a read-only memory (ROM), a random-access memory (RAM), a hard disk drive (HDD), a solid-state drive (SSD), one or more other computer-readable and/or computer-writable storage media, or a combination of two or more thereof.

The I/O module 142 may include various signal interfaces, receivers, transmitters, and/or other circuitry to receive, produce, and transmit signals as described herein, for example. In the embodiment shown, the I/O module 142 includes a keyboard input signal interface 144 for receiving input signals from the keyboard 126, a mouse input signal interface 146 for receiving input signals from the mouse 128, and a PTZ input signal interface 148 for receiving input signals from the PTZ joystick 130. The I/O module 142 also includes a network signal interface 150 for receiving input signals from, and producing and transmitting output signals to, the computer network 124. The I/O module 142 also includes a display screen output signal interface 152 for producing and transmitting signals to the display screen 132. The display screen 132 is therefore part of, or more generally may be controlled by and associated with, the local computing device 102.

The local computing device 102 and the processor circuit 134 are examples only, and alternative embodiments may differ. For example, in alternative embodiments, the local computing device 102 may include different hardware, different software, or both. Such different hardware may include more than one microprocessor, more than one CPU, one or more circuits, or a combination of two or more thereof, and may include alternatives to laptop computers, such as tablet computers, smartphones, or other computing devices. Further, in some embodiments, "local computing device" may refer to separate computing devices that function as a local computing device as described herein.

The program memory 138 includes operating system program codes 154 of an operating system, such as Microsoft™ Windows™, for example. The program memory 138 also includes web browser program codes 156 of a standalone web browser application, such as Google™ Chrome™, for example. The program memory 138 also includes local application program codes 158, which may be executed to allow a user of the local computing device 102 to monitor one or more locations (such as the locations 114, 118, and 122 shown in FIG. 1, for example).

The local application program codes 158 include web browser functionality program codes 160. The web browser functionality program codes 160 may include program codes of a known web browser, such a Chromium Embedded Framework for example, or may be other program codes that, when executed by the microprocessor 136, cause the processor circuit 134 to implement at least some functionality of a web browser as described herein, for example. Such web browser functionality may include implementing a web application as described herein, for example.

In some embodiments, the web browser program codes 156, the web browser functionality program codes 160, or both may include program codes that enable rendering of video to the HTML5 standard and may enable rendering of video codes encoded in particular video encoding formats, such as Motion JPEG, H.264, WebM, Ogg, MP4, or a two or more thereof, for example.

In general, a web browser can execute program codes of a web application to implement the web application, and such program codes of a web application may include program codes in a hypertext markup language (HTML), in JavaScript™, in one or more other coding formats, or in a combination of two or more thereof. A web application may appear and function similarly to an ordinary application, such as a desktop application or an application executable on a portable device, for example, and may provide one or more user interfaces, render video data, store data locally, and function even without a network connection (or, in other words, may function offline). Therefore, the local application of the local application program codes 158 may execute program codes of a web application and thereby host the web application in response to execution of the web browser functionality program codes 160 of the local application program codes 158 by the microprocessor 136. Reference herein to execution of program codes of a web application may refer to execution of program codes of the web application in response to execution of the web browser program codes 156, or in response to execution of the web browser functionality program codes 160 of the local application program codes 158 by the microprocessor 136.

The local application program codes 158 also include web application program codes 162 that, when executed by a web browser, cause the web browser to implement a web application (or a progressive web application (PWA), for example) according to the program codes 162 as described herein, for example. In general, the web application program codes 162 may include program codes in a hypertext markup language (HTML), in JavaScript™, in one or more other coding formats, or in a combination of two or more thereof.

The web application program codes 162 may be executed in response to execution of the web browser functionality program codes 160 of the local application program codes 158, and the web application of the web application program codes 162 may thereby be hosted by the local application of the local application program codes 158 when the microprocessor 136 executes the local application program codes 158.

The web application program codes 162 could also be executed by the standalone web browser in response to execution of the web browser program codes 156, for example in alternative embodiments in which the complete local application of the local application program codes 158 is not installed on a local computing device, but in which the web application program codes 162 are downloaded by the standalone web browser of the web browser program codes 156 or otherwise available for execution by the standalone web browser in response to execution of the web browser program codes 156. In other words, although FIG. 2 illustrates the web application program codes 162 as part of the local application program codes 158, the web application program codes 162 may be executed outside the local application of the local application program codes 158, for example by the standalone web browser in response to execution of the web browser program codes 156. However, as described below, hosting the web application of the web application program codes 162 in the local application of the local application program codes 158 may facilitate additional functionality that would not be available when the web application is hosted by the standalone web browser of the web browser program codes 156.

Using the operating system of the operating system program codes 154, the user of the local computing device 102 may initiate the web application of the web application program codes 162 such that the web application is executed by the web browser functionality program codes 160 of the local application program codes 158 and thereby hosted by the local application of the local application program codes 158. In some embodiments, the web application will appear to the user of the local computing device 102 to be an ordinary application (such as a desktop application, for example) initiated by the operating system of the local computing device 102.

Figures 3, 4:
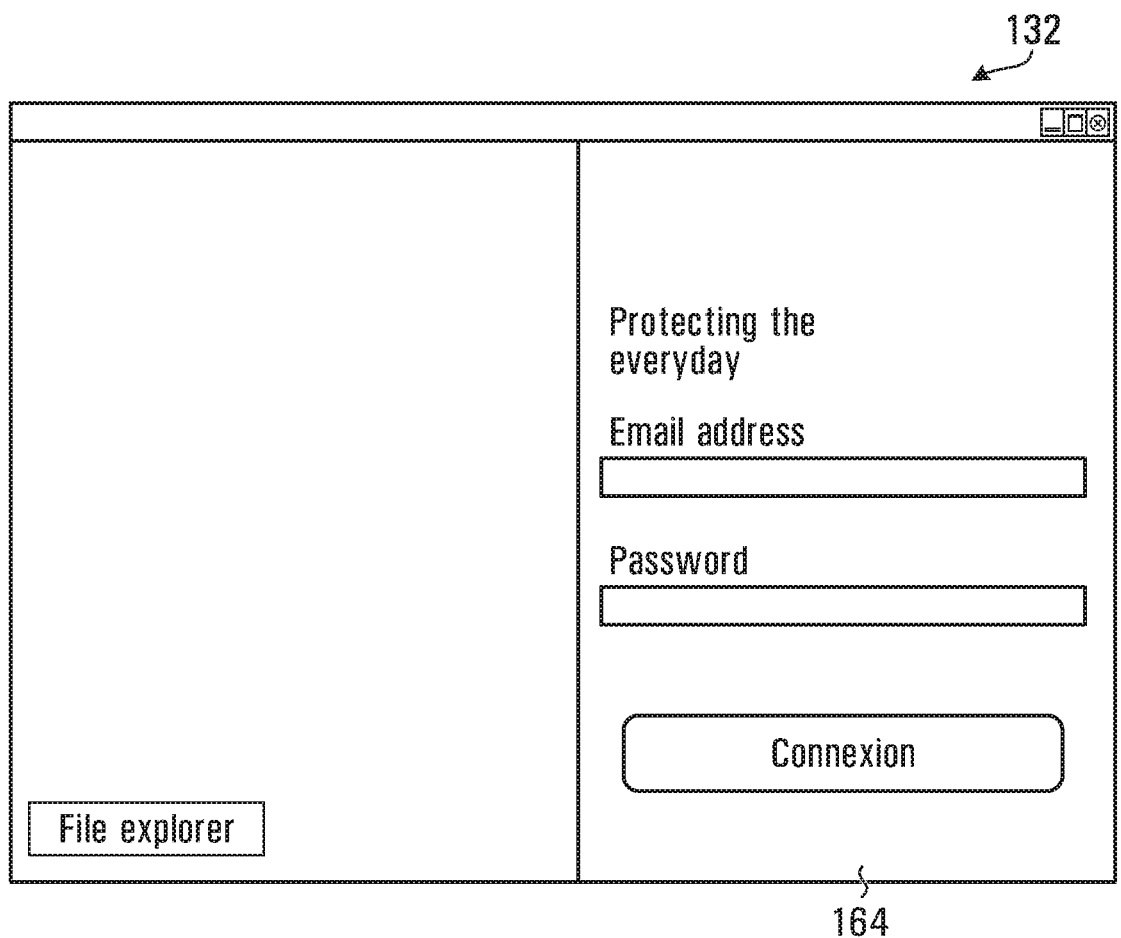
FIG. 3 is a schematic illustration of a user authentication user interface of a web application hosted by a local application on the local computing device of FIG. 2.
FIG. 4 is a schematic illustration of a video recording device selection user interface of the web application of the local computing device of FIG. 2.

Referring to FIG. 3, initiating the web application of the web application program codes 162 may cause the display screen 132 (also shown in FIG. 1) of the local computing device 102 to display a user authentication user interface 164. The user of the local computing device 102 may enter an e-mail address or username, and a password, or other user authentication information, which may be compared to user account records in a user accounts store 166 (shown in FIG. 2) in the storage memory 140.

Referring to FIG. 4, if the user of the local computing device 102 is successfully authenticated using the user authentication user interface 164, then the web application of the web application program codes 162 may cause the display screen 132 of the local computing device 102 to display a video recording device selection user interface 168, which may display selectable regions associated with respective different video recording devices of the video monitoring system 100 (shown in FIG. 1). For example, the video recording device selection user interface 168 may include a selectable region 170 for selecting the video recording device 106 at the location 114, a selectable region 172 for selecting the video recording device 108 at the location 118, and a selectable region 174 for selecting the video recording device 110 at the location 122. Representations of such video recording devices of the monitoring system 100, and of such locations, may be stored in a video recording devices store 176 (shown in FIG. 2) in the storage memory 140.

In general, a web application on one local computing device may provide some functionality without requiring any computer network to any other local computing device (or, in other words, may provide some functionality offline). Therefore, referring back to FIG. 2, because the user accounts store 166 of the local computing device 102 may store user account records for user authentication, and because the video recording devices store 176 of the local computing device 102 may store representations of the video recording devices of the monitoring system 100 and of respective locations of the video recording devices of the monitoring system 100, when the web application of the web application program codes 162 is hosted by the standalone web browser of the web browser program codes 156 or by the local application of the local application program codes 158, the user may interact with the user authentication user interface 164 of the web application for user authentication, and may interact with the video recording device selection interface 168 of the web application, offline or without requiring any computer network connection between the local computing device 102 and any other computing device, such as the server 104 (shown in FIG. 1), for example. However, the server 104 may also facilitate video monitoring as described herein, for example.

Figure 5:
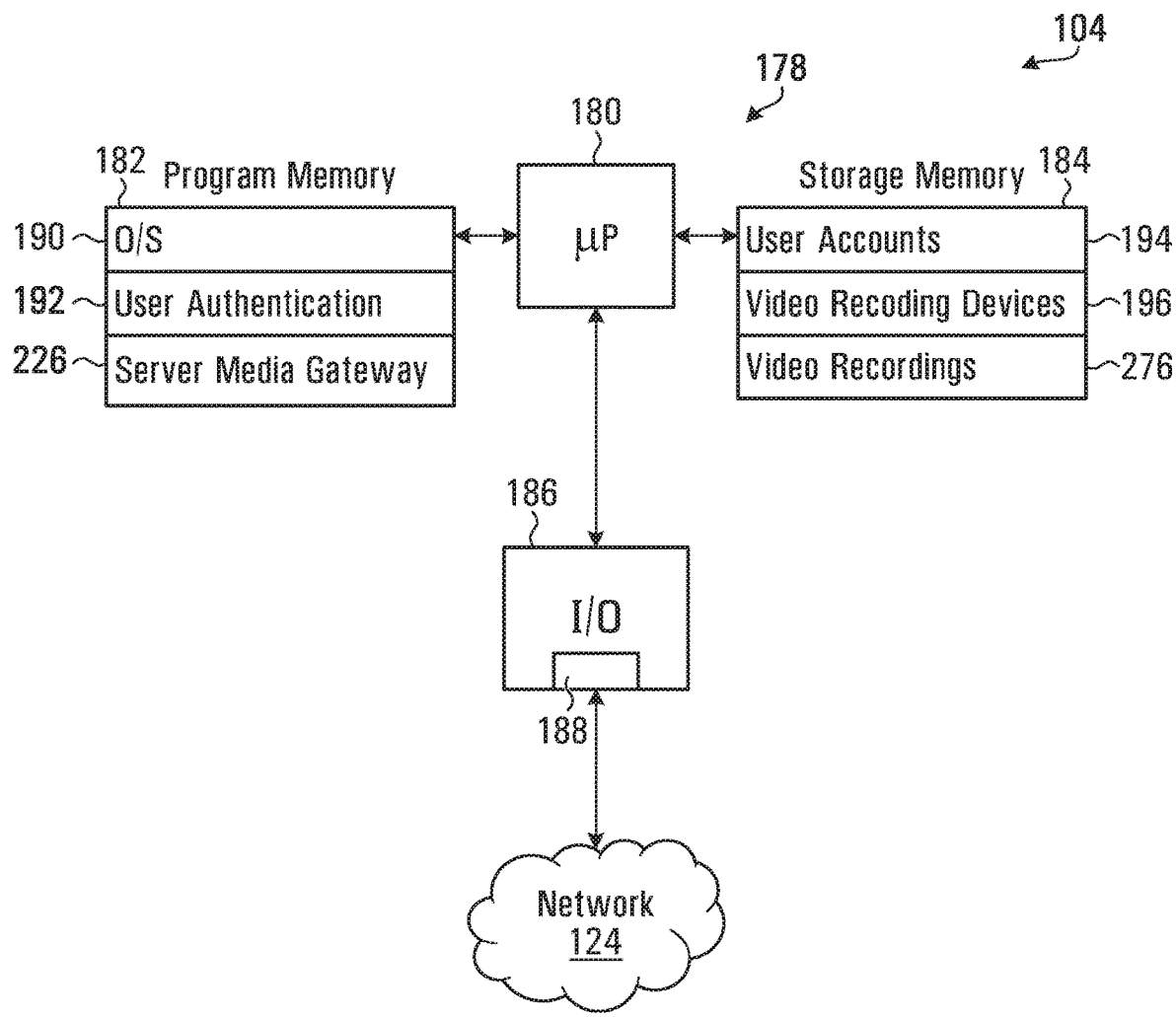
FIG. 5 is a schematic illustration of a server of the video monitoring system of FIG. 1.

Referring to FIG. 5, the server 104 includes a processor circuit shown generally at 178. The processor circuit 178 includes a CPU or microprocessor 180. The processor circuit 178 also includes a program memory 182, a storage memory 184, and an I/O module 186 all in communication with the microprocessor 180. Again, in general, the program memory 182 stores program codes that, when executed by the microprocessor 180, cause the processor circuit 178 to implement functions of the server 104 such as those described herein, for example, and the storage memory 184 includes stores for storing storage codes as described herein, for example. Also, the program memory 182 and the storage memory 184 may be implemented in one or more of the same or different storage media, which in various embodiments may include one or more of a ROM, a RAM, a HDD, a SDD, one or more other computer-readable and/or computer-writable storage media, or a combination of two or more thereof. The I/O module 186 includes a network signal interface 188 for receiving input signals from, and producing and transmitting output signals to, the computer network 124.

The server 104 and the processor circuit 178 are examples only, and alternative embodiments may differ. For example, in alternative embodiments, the server 104 may include different hardware, different software, or both. Such different hardware may include more than one microprocessor, more than one CPU, one or more circuits, or a combination of two or more thereof. Further, in some embodiments, "server" may refer to separate computing devices that function as a server as described herein.

The program memory 182 includes operating system program codes 190 and user authentication program codes 192. In some embodiments, the user authentication program codes 190 may facilitate user authentication, and may retrieve user account records from a user accounts store 194 in the storage memory 184. Further, the storage memory 184 may include a video recording devices store 196, which (like the video recording devices store 176 shown in FIG. 2) may store representations of video recording devices of the video monitoring system 100, and representations of respective locations of such video recording devices, for use in user selection of one or more video recording devices.

When the user of the local computing device 102 selects a video recording device for video monitoring, for example by selecting one of the selectable regions 170, 172, and 174 in the video recording device selection user interface 168 (shown in FIG. 4), the video data from the selected video recording device may be available already encoded in more than one video encoding format. In some embodiments, if the video data from the selected video recording device is available already encoded in more than one video encoding format, then the user of the local computing device 102 may be able to select one of the available video encoding formats. Also, in some embodiments, if the video data from the selected video recording device is available already encoded in more than one video encoding format, and if at least one of the available video encoding formats is supported for rendering by the web browser functionality program codes 160, then the web application of the web application program codes 162 may automatically select one of the available video encoding formats that is supported for rendering by the web browser functionality program codes 160.

However, the video data from the selected video recording device may be available already encoded in one or more video encoding formats that are not supported for rendering by the web browser functionality program codes 160. Therefore, as described below, for example, the local application of the local application program codes 158 may cause the local computing device 102 or the server 104 to transcode the video data from the selected video recording device to a video encoding format that is supported for rendering by the local application.

Figure 6:
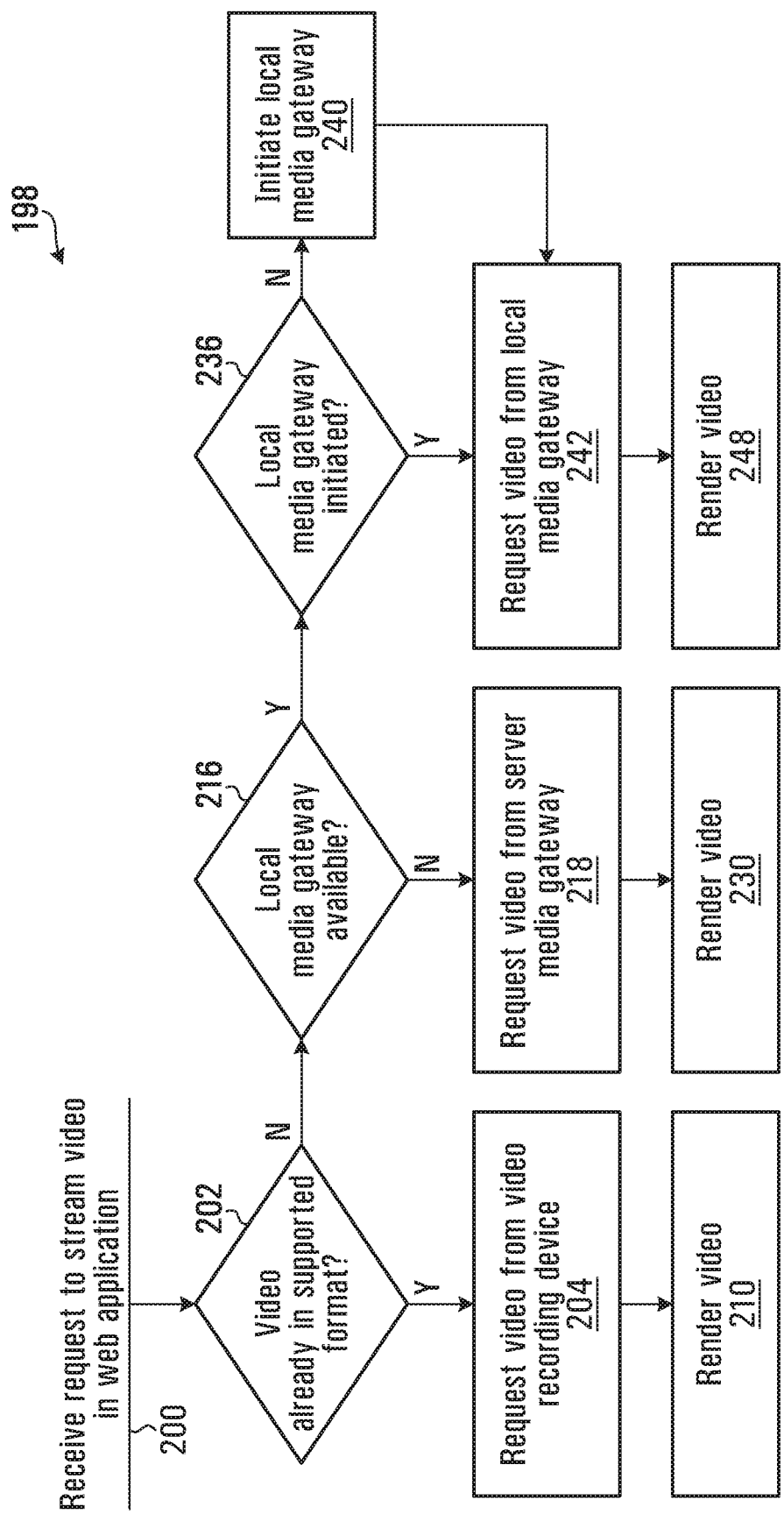
FIG. 6 is a schematic illustration of program codes of the web application of the local computing device of FIG. 2.

In one embodiment, when the user of the local computing device 102 selects a video recording device for video monitoring, for example by selecting one of the selectable regions 170, 172, and 174 in the video recording device selection user interface 168 (shown in FIG. 4), the web application of the web application program codes 162 causes program codes of the web application program codes 162 and shown generally at 198 in FIG. 6 to be executed. In general, the program codes 198 include blocks of program codes of the web application program codes 162 that may be executed in response to user selection of a video recording device for video monitoring by the user of the local computing device 102. As indicated above, reference to execution of the program codes 198 may refer to execution of the program codes 198 in response to execution of the web browser functionality program codes 160 of the local application program codes 158 by the microprocessor 136.

Figure 7:
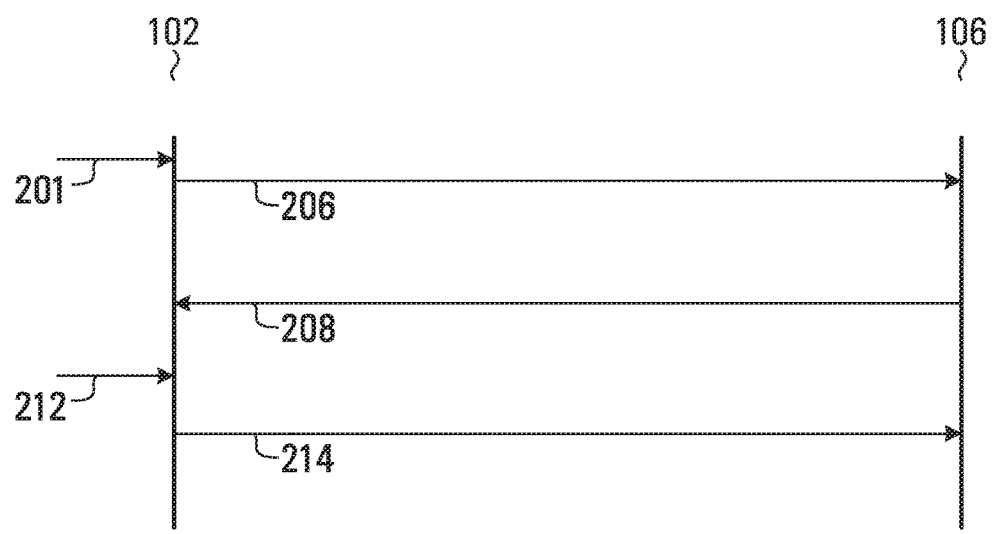
FIG. 7 is a schematic illustration of one example of a sequence of signals and data transmission according to the program codes of FIG. 6.

Referring to FIGS. 6 and 7, the program codes 198 begin at 200 in response to receiving, from the user of the local computing device 102, at least one input signal 201 indicating a request to monitor a video recording device of the video monitoring system 100 (shown in FIG. 1), for example by selecting one of the selectable regions 170, 172, and 174 in the video recording device selection user interface 168. In some embodiments, the at least one input signal 201 may represent selection from a plurality of video recording devices of a video monitoring system, such as the video recording devices 106, 108, and 110 of the video monitoring system 100 shown in FIG. 1, for example, so the at least one input signal 201 may be at least one video recording device selection input signal. The at least one input signal 201 may be received at the keyboard input signal interface 144 in response to user input using the keyboard 126, at the mouse input signal interface 146 in response to user input using the mouse 128, at a different input signal interface, or at a combination of two or more thereof, for example. Also, as indicated above, in some embodiments, if the video data from the selected video recording device is available already encoded in more than one video encoding format, then the user of the local computing device 102 may be able to select one of the available video encoding formats, and in such embodiments, the input signal 201 may represent user selection of a selected video encoding format from the available video encoding formats.

The program codes 198 continue at block 202, which includes program codes that, when executed, cause the processor circuit 134 to determine whether an input video encoding format of input video data from the selected video recording device is supported for rendering by the web browser functionality program codes 160 (and therefore supported for rendering by the local application of the local application program codes 158).

If at block 202 the input video encoding format is supported for rendering by the web browser functionality program codes 160, then the program codes 198 continue at block 204, which includes program codes that, when executed, cause the computer network interface 150 (shown in FIG. 2) of the local computing device 102 to produce at least one video request signal 206 and to transmit the at least one video request signal 206 to the requested video recording device (the video recording device 106 in the embodiment shown, although alternative embodiments may differ) using the computer network 124. In response, the video recording device 106 transmits input video data 208 in the input video encoding format to the computer network interface 150 of the local computing device 102 using the computer network 124. In the embodiment shown, the input video data 208 represent a video recording by the video recording device 106 at the location 114, and the input video data 208 may represent inter coded frames of the video recording. Transmission of the input video data 208 using the computer network 124 may be referred to as streaming the video recording by the video recording device 106 at the location 114.

The program codes 198 then continue at block 210, which includes program codes that, when executed, cause the processor circuit 134 to render the input video data 208 (using the web browser functionality program codes 160 of the local application program codes 158) on the display screen 132.

Referring to FIG. 7, while the processor circuit 134 of the local computing device 102 renders the input video data 208 from the requested video recording device, the local computing device 102 may receive at least one video recording device control input signal 212. For example, the PTZ input signal interface 148 (shown in FIG. 2) of the processor circuit 134 of the local computing device 102 may receive the at least one video recording device control input signal 212 in response to user actuation of the PTZ joystick 130 (shown in FIG. 1). The at least one video recording device control input signal 212 may also be received at another input signal interface, such as the keyboard input signal interface 144 or the mouse input signal interface 146, for example. In response to the at least one video recording device control input signal 212, the local application program codes 158 (by execution of the web application program codes 162, for example) may cause the computer network interface 150 (shown in FIG. 2) of the local computing device 102 to produce at least one video recording device control signal 214 and to transmit the at least one video recording device control signal 214 to the video recording device 106. In response to the at least one video recording device control signal 214, the video recording device 106 may change the field of view 112 of the video recording device 106, for example by changing a pan, a tilt, a zoom, or two or more thereof of the video recording device 106. Therefore, the local computing device 102 (or the web application of the program codes 162) may control the video recording device 106 in response to the at least one video recording device control input signal 212, for example by changing the field of view 112 of the video recording device 106.

Although FIG. 7 illustrates transmitting and receiving data and signals directly between the local computing device 102 and the video recording device 106, such data and signals may be transmitted indirectly in some embodiments, for example using the server 104 or one or more other computing devices, for example.

As indicated above, the web application program codes 162 (and therefore the program codes 198) could be executed by the standalone web browser in response to execution of the web browser program codes 156, or by the local application in response to execution of the web browser functionality program codes 160 of the local application program codes 158. In some embodiments, when the program codes 198 are executed by the local application in response to execution of the web browser functionality program codes 160 of the local application program codes 158, a local media gateway may be available to transcode the input video data from the input video encoding format to a transcoded video encoding format that is supported for rendering by the web browser functionality program codes 160 (and therefore supported for rendering by the local application of the local application program codes 158). However, in some embodiments, when the program codes 198 are executed by the standalone web browser in response to execution of the web browser program codes 156, such a local media gateway may not be available to transcode the input video data.

Figure 8:
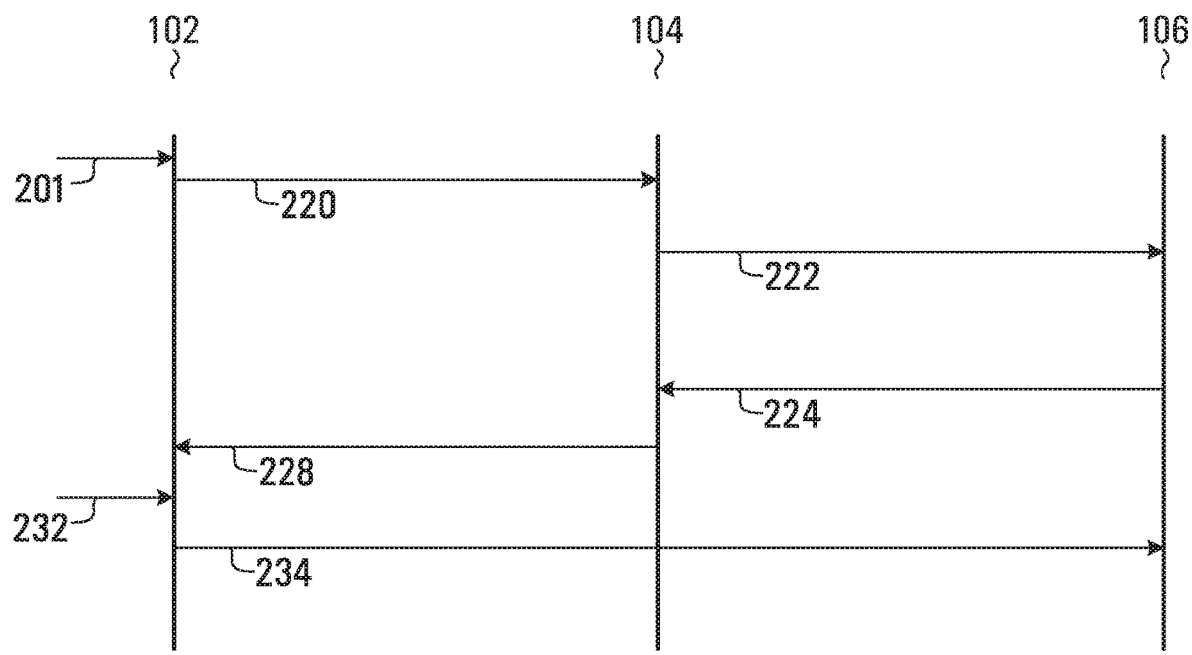
FIG. 8 is a schematic illustration of another example of a sequence of signals and data transmission according to the program codes of FIG. 6.

Therefore, referring to FIGS. 6 and 8, if at block 202 the input video encoding format is not supported for rendering by the web browser functionality program codes 160, then the program codes 198 continue at block 216, which includes program codes that, when executed, cause the processor circuit 134 to determine whether a local media gateway of local media gateway program codes 217 (shown in FIG. 2) in the program memory 138 is available. More generally, the program codes at block 216, when executed, cause the local computing device 102 to determine whether the local computing device 102 is able to transcode the input video data 224 to a transcoded video encoding format that is supported for rendering by the web browser functionality program codes 160 (and therefore supported for rendering by the local application of the local application program codes 158).

In some embodiments, the local application program codes 158 may include the local media gateway program codes 217. In other embodiments, local media gateway program codes 217 are separate from the local application program codes 158. Therefore, FIG. 2 includes a dashed line between the local application program codes 158 and the local media gateway program codes 217.

In some embodiments, when the web application program codes 162 include JavaScript™ program codes, the web application program codes 162 may include program codes that, when executed, cause the processor circuit 134 to create a quarkEngine object, for example as follows:

await CefSharp.BindObjectAsync("quarkEngine");

Such a quarkEngine object may serve as a bridge between the web application of the web application program codes 162 and the local media gateway of the local media gateway program codes 217 (shown in FIG. 2) in the program memory 138.

In such embodiments when the web application program codes 162 include JavaScript™ program codes, the program codes at block 216 may include program codes as follows:

```
async function playVideo(server, cameraId) {
    var uri = null;
    if (quarkEnqine != null) {
        uri = await quarkEngine.getLocalStreamAsync(cameraId);
    }
    if (uri == null) {
        uri = server + camera;
    }
    player.playVideo(uri);
}
```

Still referring to FIGS. 6 and 8, if at block 216 a local media gateway is not available, then the program codes 198 continue at block 218, which includes program codes that, when executed, cause the computer network interface 150 (shown in FIG. 2) of the local computing device 102 to produce at least one video request signal 220 and to transmit the at least one video request signal 220 to the network signal interface 188 (shown in FIG. 5) of the server 104 using the computer network 124. In response to the at least one video request signal 220, the network signal interface 188 of the server 104 produces at least one video request signal 222 and transmits the at least one video request signal 222 to the requested video recording device (the video recording device 106 in the embodiment shown, although alternative embodiments may differ). In response to the at least one video request signal 222, the video recording device 106 transmits input video data 224 in the input video encoding format to the network signal interface 188 of the server 104 using the computer network 124. In the embodiment shown, the input video data 224 represent a video recording by the video recording device 106 at the location 114, and the input video data 224 may represent inter coded frames of the video recording.

Referring to FIGS. 5 and 8, the microprocessor 180 of the server 104 executes server media gateway program codes 226 in the program memory 182 to transcode the input video data 224 from the input video encoding format into transcoded video data 228, and the network interface 188 of the server 104 causes the transcoded video data 228 to be transmitted to the network interface 150 (shown in FIG. 2) of the local computing device 102 using the computer network 124. In the embodiment shown, the transcoded video data 228 also represent a video recording by the video recording device 106 at the location 114, and the transcoded video data 228 may also represent inter coded frames of the video recording. Transmission of the input video data 224 and the transcoded video data 228 using the computer network 124 may be referred to as streaming the video recording by the video recording device 106 at the location 114.

Referring back to FIGS. 6 and 8, after block 218, the program codes 198 continue at block 230, which includes program codes that, when executed, cause the cause the processor circuit 134 to render the transcoded video data 228 (using the web browser functionality program codes 160 of the local application program codes 158) on the display screen 132.

Referring to FIG. 8, while the processor circuit 134 of the local computing device 102 renders the input video data 228 from the requested video recording device, the local computing device 102 may receive at least one video recording device control input signal 232. For example, the PTZ input signal interface 148 (shown in FIG. 2) of the processor circuit 134 of the local computing device 102 may receive the at least one video recording device control input signal 232 in response to user actuation of the PTZ joystick 130 (shown in FIG. 1). The at least one video recording device control input signal 232 may also be received at another input signal interface, such as the keyboard input signal interface 144 or the mouse input signal interface 146, for example. In response to the at least one video recording device control input signal 232, the local application program codes 158 (by execution of the web application program codes 162, for example) may cause the computer network interface 150 (shown in FIG. 2) of the local computing device 102 to produce at least one video recording device control signal 234 and to transmit the at least one video recording device control signal 234 to the video recording device 106. In response to the at least one video recording device control signal 234, the video recording device 106 may change the field of view 112 of the video recording device 106, for example by changing a pan, a tilt, a zoom, or two or more thereof of the video recording device 106. Therefore, the local computing device 102 (or the web application of the program codes 162) may control the video recording device 106 in response to the at least one video recording device control input signal 232, for example by changing the field of view 112 of the video recording device 106.

Although FIG. 8 illustrates transmitting the at least one video recording device control signal 234 directly from the local computing device 102 to the video recording device 106, the at least one video recording device control signal 234 may be transmitted indirectly in some embodiments, for example using the server 104 or one or more other computing devices, for example.

Figure 9:
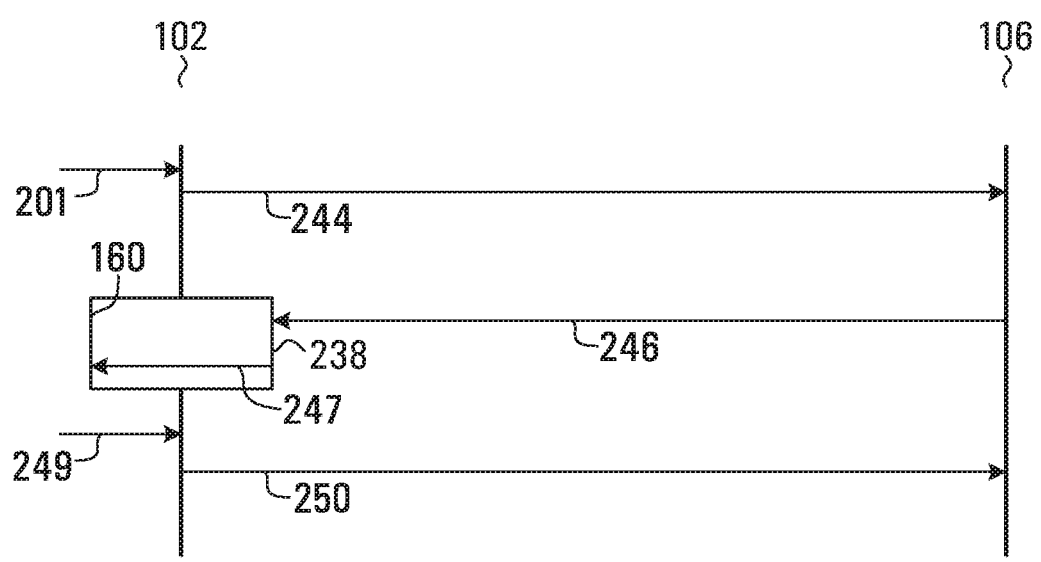
FIG. 9 is a schematic illustration of another example of a sequence of signals and data transmission according to the program codes of FIG. 6.

Referring to FIGS. 6 and 9, if at block 216 the local media gateway is available, then the program codes 198 continue at block 236, which includes program codes that, when executed, cause the processor circuit 134 to determine whether the local media gateway of local media gateway program codes 217 (shown in FIG. 2) in the program memory 138 is initiated.

If at block 236 the local media gateway of the local media gateway program codes 217 is not initiated, then the program codes 198 continue at block 240, which includes program codes that, when executed, cause the processor circuit 134 to initiate the local media gateway of the local media gateway program codes 217.

In embodiments when the web application program codes 162 include JavaScript™ program codes, the program codes at blocks 236 and 240 may include program codes as follows:

```
public async Task<string> getLocalStreamAsync(string cameraId) {
    string uri = null;
    if (IsMediaGatewayInstalled( )) {
        await EnsureMediaGatewayStartedAsync( );
        uri = await StartLocalLiveStream(cameraId);
    }
    return uri;
}
```

If at block 236 the local media gateway of the local media gateway program codes 217 is initiated, or after block 240, the program codes 198 continue at block 242, which includes program codes that, when executed, cause the computer network interface 150 (shown in FIG. 2) of the local computing device 102 to produce at least one video request signal 244 and to transmit the at least one video request signal 244 to the requested video recording device (the video recording device 106 in the embodiment shown, although alternative embodiments may differ) using the computer network 124. In response, the video recording device 106 transmits input video data 246 in the input video encoding format to the computer network interface 150 of the local computing device 102 using the computer network 124. In some embodiments, the program codes at block 242, when executed, cause the web application of the web application program codes 162 to request, from the local media gateway of the local media gateway program codes 217, video data from the requested video recording device. In the embodiment shown, the input video data 246 represent a video recording by the video recording device 106 at the location 114, and the input video data 246 may represent inter coded frames of the video recording. Transmission of the input video data 246 using the computer network 124 may be referred to as streaming the video recording by the video recording device 106 at the location 114.

The program codes at block 242, when executed, cause the local media gateway of the local media gateway program codes 217 to receive the input video data 246 and to transcode the input video data 246 from the input video encoding format into transcoded video data 247.

In other words, in the embodiment shown, execution of the program codes at block 242 is in response to a determination at block 216 that the local computing device 102 is able to transcode the input video data 224 to a transcoded video encoding format that is supported for rendering by the web browser functionality program codes 160 (and therefore supported for rendering by the local application of the local application program codes 158), and execution of the program codes at block 242 causes the web application of the web application program codes 162, when hosted by the local application of the local application program codes 158 on the local computing device 102, to cause the local media gateway of the local media gateway program codes 217 to receive the input video data 246 and to transcode (thereby causing the local computing device 102 to transcode) the input video data 246 (representing a video recording by the video recording device 106 at the location 114 shown in FIG. 1, and encoded in an input video encoding format) to transcoded video data 247 transcoded in an output a transcoded video encoding format supported for rendering by the web browser functionality program codes 160 (and therefore supported for rendering by the local application of the local application program codes 158), and to communicate the transcoded video data 247 to the web application of the web application program codes 162.

After block 242, the program codes 198 continue at block 248, which includes program codes that, when executed, cause the cause the processor circuit 134 to render the transcoded video data 247 (using the web browser functionality program codes 160 of the local application program codes 158) on the display screen 132. In other words, in the embodiment shown, execution of the program codes at block 242 causes the web application of the web application program codes 162, when hosted by the local application of the local application program codes 158 on the local computing device 102, to render a video using the transcoded video data 247.

Referring to FIG. 9, while the processor circuit 134 of the local computing device 102 renders the transcoded video data 247, the PTZ input signal interface 148 (shown in FIG. 2) of the processor circuit 134 of the local computing device 102 may receive at least one video recording device control input signal 249. For example, the PTL input signal interface 148 (shown in FIG. 2) of the processor circuit 134 of the local computing device 102 may receive the at least one video recording device control input signal 249 in response to user actuation of the PTZ joystick 130 (shown in FIG. 1). The at least one video recording device control input signal 249 may also be received at another input signal interface, such as the keyboard input signal interface 144 or the mouse input signal interface 146, for example. In response to the at least one video recording device control input signal 249, the local application program codes 158 (by execution of the web application program codes 162, for example) may cause the computer network interface 150 (shown in FIG. 2) of the local computing device 102 to produce at least one video recording device control signal 250 and to transmit the at least one video recording device control signal 250 to the video recording device 106. In response to the at least one video recording device control signal 250, the video recording device 106 may change the field of view 112 of the video recording device 106, for example by changing a pan, a tilt, a zoom, or two or more thereof of the video recording device 106. Therefore, the local computing device 102 (or the web application of the program codes 162) may control the video recording device 106 in response to the at least one video recording device control input signal 249, for example by changing the field of view 112 of the video recording device 106.

Although FIG. 9 illustrates transmitting and receiving data and signals directly between the local computing device 102 and the video recording device 106, such data and signals may be transmitted indirectly in some embodiments, for example using the server 1114 or one or more other computing devices, for example.

As indicated above, in the embodiment of FIGS. 6-9, when the user of the local computing device 102 selects a video recording device for video monitoring, for example by selecting one of the selectable regions 170, 172, and 174 in the video recording device selection user interface 168 (shown in FIG. 4), the web application of the web application program codes 162 causes the program codes 198 to be executed.

Figure 10:
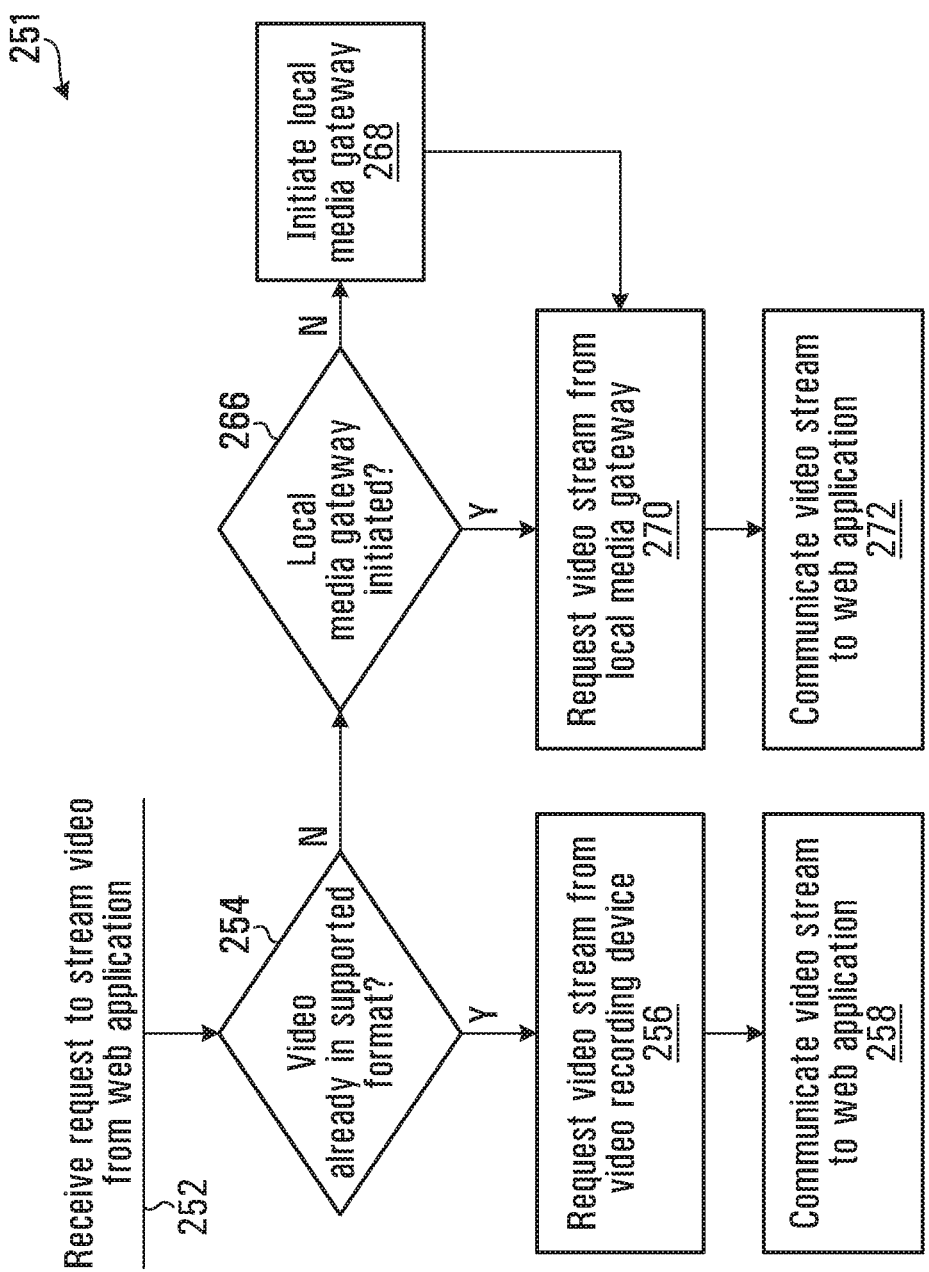
FIG. 10 is a schematic illustration of program codes of the local application of the local computing device of FIG. 2.

However, in another embodiment, when the user of the local computing device 102 selects a video recording device for video monitoring, for example by selecting one of the selectable regions 170, 172, and 174 in the video recording device selection user interface 168, the web application of the web application program codes 162 produces a request to monitor the selected video recording device, the local application of the local application program codes 158 intercepts the request, and in response to the request, the local application of the local application program codes 158 causes program codes of local application program codes 158 and shown generally at 251 in FIG. 10 to be executed. In other words, although FIG. 2 illustrates both the program codes 198 and 251, some embodiments may omit either the program codes 198 or the program codes 251.

In general, the program codes 251 include blocks of program codes of the local application program codes 158 that may be executed by the microprocessor 136 in response to user selection of a video recording device for video monitoring by the user of the local computing device 102. When executed, the program codes 198 and 251 implement similar functionality, although the program codes 198 are program codes of the web application program codes 162, whereas the program codes 251 are program codes of the local application program codes 158.

Referring to FIG. 10, the program codes 251 begin at 252 in response to receiving, from the web application of the web application program codes 162, a request to monitor a selected video recording device, for example in response to user selection of one of the selectable regions 170, 172, and 174 in the video recording device selection user interface 168. The web application of the web application program codes 162 may produce such a request in response to at least one input signal, such as the at least one input signal 201 described above, for example.

The program codes 251 continue at block 254, which includes program codes that, when executed by the microprocessor 136, cause the processor circuit 134 to determine whether an input video encoding format of input video data from the selected video recording device is supported for rendering by the web browser functionality program codes 160 (and therefore supported for rendering by the local application of the local application program codes 158).

If at block 254 the input video encoding format is supported for rendering by the web browser functionality program codes 160, then the program codes 251 continue at block 256, which includes program codes that, when executed by the microprocessor 136, cause the computer network interface 150 (shown in FIG. 2) of the local computing device 102 to produce at least one video request signal (similar to the at least one video request signal 206 shown in FIG. 7) and to transmit the at least one video request signal to the requested video recording device using the computer network 124. In response, the requested video recording device transmits input video data (similar to the input video data 208 shown in FIG. 7) in the input video encoding format to the computer network interface 150 of the local computing device 102 using the computer network 124. The program codes 251 then continue at block 258, which includes program codes that, when executed by the microprocessor 136, cause the input video data to be communicated to the web application of the web application program codes 162. Execution of the web application program codes 162 then causes the processor circuit 134 to render the input video data (using the web browser functionality program codes 160 of the local application program codes 158) on the display screen 132.

As indicated above, in some embodiments, when the program codes 198 are executed by the standalone web browser in response to execution of the web browser program codes 156, a local media gateway may not be available to transcode the input video data, so the program codes 198 include the program codes at block 216, which, when executed, cause the processor circuit 134 to determine whether a local media gateway is available. However, unlike the program codes 198, the program codes 251 are program codes of the local application program codes 158, so in the embodiment shown, the local media gateway is available, and the program codes 251 may not require program codes similar to the program codes at blocks 216, 218, and 230 as described above.

Therefore, if at block 254 the input video encoding format is not supported for rendering by the web browser functionality program codes 160, then the program codes 251 continue at block 266, which includes program codes that, when executed by the microprocessor 136, cause the processor circuit 134 to determine whether the local media gateway of the local media gateway program codes 217 is initiated. If at block 266 the local media gateway of the local media gateway program codes 217 is not initiated, then the program codes 251 continue at block 268, which includes program codes that, when executed by the microprocessor 136, cause the processor circuit 134 to initiate the local media gateway of the local media gateway program codes 217.

If at block 266 the local media gateway of the local media gateway program codes 217 is initiated, or after block 268, the program codes 251 continue at block 270, which includes program codes that, when executed by the microprocessor 136, cause the computer network interface 150 (shown in FIG. 2) of the local computing device 102 to produce at least one video request signal (similar to the at least one video request signal 244 shown in FIG. 9) and to transmit the at least one video request signal to the requested video recording device using the computer network 124. In some embodiments, the program codes at block 270, when executed, cause the local application of the local application program codes 158 to request, from the local media gateway of the local media gateway program codes 217, video data from the requested video recording device. Further, the program codes at block 270 are executed in response to a request received at 252 from the web application of the web application program codes 162, so such a request at block 270 from the local media gateway of the local media gateway program codes 217 may be caused by the web application of the web application program codes 162. In response to the at least one video request signal from the local computing device 102, the video recording device 106 transmits input video data (similar to the input video data 246 shown in FIG. 9) in the input video encoding format to the computer network interface 150 of the local computing device 102 using the computer network 124.

The program codes at block 270, when executed by the microprocessor 136, cause the local media gateway of the local media gateway program codes 217 to transcode the input video data from the input video encoding format into transcoded video data. After block 270, the program codes 251 continue at block 272, which includes program codes that, when executed by the microprocessor 136, cause the local application of the local application program codes 158 to communicate the transcoded video data to the web application of the web application program codes 162. Execution of the web application program codes 162 then causes the processor circuit 134 to render the transcoded video data (using the web browser functionality program codes 160 of the local application program codes 158) on the display screen 132.

In the embodiment shown, the microprocessor 136 executes the program codes at blocks 270 and 272 in response to receiving, from the web application of the web application program codes 162, a request to monitor a selected video recording device at 252. Therefore, in the embodiment shown, execution of the program codes at blocks 270 and 272 is caused by the web application of the web application program codes 162, when hosted by the local application of the local application program codes 158 on the local computing device 102.

Further, in the embodiment shown, execution of the program codes at block 270 causes the local media gateway of the local media gateway program codes 217 to receive input video data (similar to the input video data 246 shown in FIG. 9, representing a video recording by a video recording device such as the video recording device 106 at the location 114 shown in FIG. 1, and encoded in an input video encoding format) and to transcode (thereby causing the local computing device 102 to transcode) the input video data to transcoded video data transcoded in an output a transcoded video encoding format supported for rendering by the web browser functionality program codes 160 (and therefore supported for rendering by the local application of the local application program codes 158).

As indicated above, in the embodiment of FIGS. 6-9, the computer network interface 150 (shown in FIG. 2) of the local computing device 102 may produce at least one video recording device control signal 214, 234, or 250 to control a video recording device (such as the video recording device 106). Likewise, while input video data are communicated to the web application of the web application program codes 162 at block 258 or at block 272, the local computing device 102 may receive at least one video recording device control input signal, and in response to the at least one video recording device control input signal, at least one video recording device control signal (similar to the at least one video recording device control signal 214, 234, or 250) may be produced and transmitted to a video recording device (such as the video recording device 106) to control a video recording device.

In the embodiment shown, the storage memory 140 (shown in FIG. 2) also includes a video recordings store 274 for storing video data that may be received, or produced by transcoding, at the local computing device 102, such as the video data 214, 228, 246, and 247 as described above, for example. As indicated above, in general, a web application on one local computing device may provide some functionality without requiring any computer network to any other computing device. Therefore, when the web application of the web application program codes 162 is hosted by the standalone web browser of the web browser program codes 156 or by the local application of the local application program codes 158, the user may interact with one or more user interfaces of the web application to render video data that may be stored in the video recordings store 274. In other words, video data stored in the video recordings store 274 (such as the video data 214, 228, 246, and 247 as described above, for example, or other video data) may be rendered offline, or without requiring any computer network connection between the local computing device 102 and any other computing device, such as the server 104 (shown in FIG. 1), for example. Likewise, in the embodiment shown, the storage memory 184 (shown in FIG. 5) also includes a video recordings store 276 for storing video data that may be received, or produced by transcoding, at the server 104, such as video data 224 or 228 as described above, for example.

As indicated above, the display screen 132 is part of, or more generally may be controlled by and associated with, the local computing device 102, and the web application program codes 162, when executed, may cause video data (such as the video data 214, 228, and 247 as described above, for example) to be rendered and displayed on the display screen 132. However, alternative embodiments may differ. For example, in alternative embodiments, the local computing device 102 may control one or more other displays that may also be associated with the local computing device 102, such as one or more display screens, one or more video projectors, one or more other displays, or a combination of two or more thereof. In general, the local computing device 102 may receive at least one display selection input signal (for example, at the keyboard input signal interface 144, at the mouse input signal interface 146, at a different input signal interface, or at a combination of two or more thereof) to select from different displays that may be controlled by, and associated with, the local computing device 102. In general, the local computing device 102 may cause one or more different video recordings to be rendered and displayed on one or more of the same or different display or displays controlled by, and associated with, the local computing device 102.

In general, embodiments such as those described above may facilitate video monitoring of one or more locations (such as the location 114, 118, or 122, or two or more thereof, for example) by causing video codes, representing one or more video recordings by one or more video recording devices at the one or more locations, to be rendered and displayed to a user of the local computing device 102. In some embodiments, the local computing device 102, and one or more displays controlled by and associated with the local computing device 102, may be at one or more locations that are separate from, or visually separated from, the one or more locations (such as the location 114, 118, or 122, or two or more thereof, for example) that may be monitored.

Embodiments such as those described herein may involve transcoding on a local computing device (such as the local computing device 102). As indicated above, in some embodiments, "local computing device" may refer to separate computing devices that function as a local computing device as described herein, and "server" herein may refer to one or more computing devices that may provide server functionality of a video monitoring system to multiple local computing devices as described herein, for example. Therefore, transcoding on a local computing device (such as the local computing device 102) may refer to transcoding on one or more computing devices that are local to a location where a user may monitor another location and that do not provide server functionality of a video monitoring system to multiple local computing devices as described herein, for example.

Transcoding on a local computing device (such as the local computing device 102), as described herein for example, may reduce or avoid a transcoding burden on a server (such as the server 104), and reducing or avoiding a transcoding burden on the server may allow a video monitoring system (such as the video monitoring system 100) including the server to provide server functionality to a larger number of local computing devices (such as the local computing device 102) when compared to other video monitoring systems where more transcoding by the server is required.

Further, when compared to other video monitoring systems where more transcoding by a server is required, transcoding on a local computing device (such as the local computing device 102), as described herein for example, may reduce latency of video recordings that are rendered by the local computing device, and such reduced latency may particularly facilitate embodiments in which the local computing device includes a PTZ joystick (such as the PTZ joystick 130, for example) or another input device that permits frequent control of video recording devices (such as control of the video recording device 106 as described herein, for example).

Embodiments such as those described herein may also facilitate cloud-based video monitoring and may facilitate video monitoring using a unified video monitoring system.

Although specific embodiments have been described and illustrated, such embodiments should be considered illustrative only and not as limiting the invention as construed according to the accompanying claims.

The invention claimed is:

1. A method of facilitating video monitoring of at least one location, the method comprising:
   causing a local computing device to determine whether the local computing device is able to transcode input video data encoded in an input video encoding format to transcoded video data transcoded in a transcoded video encoding format supported for rendering by a local application on the local computing device, the input video data representing at least one video recording by at least one video recording device at the at least one location;
   causing a web application hosted by the local application to cause the local computing device to transcode the input video data to the transcoded video data in the transcoded video encoding format, wherein causing the web application to cause the local computing device to transcode the input video data to the transcoded video encoding format comprises causing the local computing device to transcode the input video data to the transcoded video encoding format in response to a determination that the local computing device is able to transcode the input video data to the transcoded video encoding format; and
   causing the web application to cause the local computing device to render and display the at least one video recording using the transcoded video data.

2. The method of claim 1 wherein:
   causing the local computing device to determine whether the local computing device is able to transcode the input video data to the transcoded video encoding format comprises causing the local computing device to determine whether a media gateway is executable on the local computing device; and
   causing the web application to cause the local computing device to transcode the input video data to the transcoded video encoding format comprises causing the web application to cause the media gateway to transcode the input video data to the transcoded video encoding format.

3. The method of claim 2 wherein program codes of the local application comprise program codes of the media gateway.

4. The method of claim 2 wherein the media gateway is separate from the local application.

5. The method of claim 1 further comprising:
   causing the local computing device to receive at least one video recording device selection input signal representing user selection of the at least one video recording device from a plurality of video recording devices of a video monitoring system comprising the at least one video recording device; and
   causing the local computing device to receive the input video data from the at least one video recording device in response to receiving the at least one video recording device selection input signal;
   wherein causing the local computing device to determine whether the local computing device is able to transcode the input video data to the transcoded video encoding format comprises causing the local computing device to determine whether the local computing device is able to transcode the input video data to the transcoded video encoding format in response to receiving the at least one video recording device selection input signal.

6. The method of claim 1 wherein causing the web application to cause the local computing device to render the at least one recording comprises causing the web application to cause at least one display that is part of the local computing device to display the video recording.

7. The method of claim 6 further comprising causing the local computing device to receive at least one display selection input signal representing user selection of the at least one display from a plurality of displays associated with the local computing device.

8. The method of claim 1 wherein the input video data represent inter coded frames of the video recording.

9. The method of claim 1 wherein causing the web application to cause the local computing device to render the at least one video recording using the transcoded video data comprises causing functionality of a web browser to render the at least one video.

10. The method of claim 9 wherein the transcoded video encoding format is a video encoding format supported for rendering by the functionality of the web browser.

11. The method of claim 1 further comprising:
   causing the local computing device to receive at least one video recording device control input signal; and
   causing the local computing device to control the at least one video recording device in response to receiving the at least one video recording device control input signal.

12. The method of claim 11 wherein causing the local computing device to control the at least one video recording device comprises causing the local computing device to cause the at least one video recording device to change a field of view of the at least one video recording device.

13. The method of claim 1 wherein the local computing device is one or more computing devices that do not provide server functionality of a video monitoring system to multiple local computing devices.

14. The method of claim 1 wherein causing the web application to cause the local computing device to transcode the input video data comprises:
   causing the web application to determine whether the input video encoding format is supported for rendering by the local application; and
   causing the local computing device to transcode the input video data in response to a determination by the web application that the input video encoding format is not supported for rendering by the local application.

15. The method of claim 1 wherein causing the web application to cause the local computing device to transcode the input video data comprises:
   in response to a request from the web application, causing the local computing device to determine whether the input video encoding format is supported for rendering by the local application; and
   causing the local computing device to transcode the input video data in response to a determination by the local computing device that the input video encoding format is not supported for rendering by the local application.

16. A method of facilitating video monitoring of at least one location, the method comprising:
   causing a web application hosted by a local application on a local computing device to cause the local computing device to transcode input video data encoded in an input video encoding format to transcoded video data transcoded in a transcoded video encoding format supported for rendering by the local application, the input video data representing at least one video recording by at least one video recording device at the at least one location; and causing the web application to cause the local computing device to render and display the at least one video recording using the transcoded video data;

wherein the web application is a progressive web application.

17. The method of claim 9 wherein:

program codes of the local application comprise web browser functionality program codes; and causing the functionality of the web browser to render the at least one video comprises causing the local computing device to execute the web browser functionality program codes.

18. The method of claim 17 wherein the web browser functionality program codes comprise program codes of a web browser.

19. A video monitoring system comprising:

a local computing device comprising:
  at least one non-transitory computer-readable storage medium comprising program codes stored thereon; and
  at least one processor operable to execute the program codes and control the at least one media interface;
wherein the program codes, when executed by the at least one processor, cause, at least:
  the local computing device to determine whether the local computing device is able to transcode input video data encoded in an input video encoding format to transcoded video data transcoded in a transcoded video encoding format supported for rendering by a local application on the local computing device, the input video data representing at least one video recording by at least one video recording device at at least one location; and
  a web application hosted by the local application to cause the local computing device to, at least:
    transcode the input video data to the transcoded video data in the transcoded video encoding format, wherein the program codes that, when executed by the at least one processor, cause the web application to cause the local computing device to transcode the input video data to the transcoded video encoding format comprise program codes that, when executed by the at least one processor, cause the web application to cause the local computing device to transcode the input video data to the transcoded video encoding format in response to a determination that the local computing device is able to transcode the input video data to the transcoded video encoding format; and
    render and display the at least one video recording using the transcoded video data.

20. A method of facilitating video monitoring of at least one location, the method comprising:

causing a web application, hosted by a local application on a local computing device, to cause a media gateway on the local computing device to receive input video data encoded in an input video encoding format, the input video data representing at least one video recording by at least one video recording device at the at least one location;

causing the local computing device to determine whether the local computing device is able to transcode the input video data to a transcoded video encoding format supported for rendering by the local application;

causing the media gateway to transcode the input video data from the input video encoding format to the transcoded video data in the transcoded video encoding format, wherein causing the media gateway to transcode the input video data to the transcoded video encoding format comprises causing the media gateway to transcode the input video data to the transcoded video encoding format in response to a determination that the local computing device is able to transcode the input video data to the transcoded video encoding format; and causing the media gateway to communicate the transcoded video data to the web application, wherein causing the media gateway to communicate the transcoded video data to the web application comprises causing the local computing device to display the at least one video recording using the transcoded video data.

21. A video monitoring system comprising:

a local computing device comprising:
  at least one non-transitory computer-readable storage medium comprising program codes stored thereon; and
  at least one processor operable to execute the program codes and control the at least one media interface;
wherein the program codes, when executed by the at least one processor, cause, at least:
  the local computing device to determine whether the local computing device is able to transcode input video data encoded in an input video encoding format to transcoded video data transcoded in a transcoded video encoding format supported for rendering by a local application on the local computing device, the input video data representing at least one video recording by at least one video recording device at at least one location; and
  a web application hosted by the local application to cause the local computing device to, at least:
    in response to a request from the web application, cause a media gateway on the local computing device to receive the input video data;
    cause the media gateway to transcode the input video data from the input video encoding format to the transcoded video data in the transcoded video encoding format, wherein the program codes that, when executed by the at least one processor, cause the web application to cause the media gateway to transcode the input video data to the transcoded video encoding format comprise program codes that, when executed by the at least one processor, cause the web application to cause the media gateway to transcode the input video data to the transcoded video encoding format in response to a determination that the local computing device is able to transcode the input video data to the transcoded video encoding format;
    cause the media gateway to communicate the transcoded video data to the web application; and
    display the at least one video recording using the transcoded video data.

* * * * *